(12) United States Patent
Oh

(10) Patent No.: US 9,497,791 B2
(45) Date of Patent: Nov. 15, 2016

(54) APPARATUS AND METHOD FOR ESTABLISHING SESSION IN A PACKET SWITCHED NETWORK

(75) Inventor: Jong-Sun Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 13/497,935

(22) PCT Filed: Sep. 28, 2010

(86) PCT No.: PCT/KR2010/006586
§ 371 (c)(1),
(2), (4) Date: Mar. 23, 2012

(87) PCT Pub. No.: WO2011/040740
PCT Pub. Date: Apr. 7, 2011

(65) Prior Publication Data
US 2012/0271958 A1 Oct. 25, 2012

(30) Foreign Application Priority Data
Sep. 29, 2009 (KR) ........................ 10-2009-0092447

(51) Int. Cl.
*G06F 15/16* (2006.01)
*H04W 76/04* (2009.01)
(Continued)

(52) U.S. Cl.
CPC .............. *H04W 76/04* (2013.01); *H04L 12/14* (2013.01); *H04W 80/10* (2013.01)

(58) Field of Classification Search
CPC ................. H04L 1/0026; H04L 1/1671; H04L 5/001; H04L 5/0055; H04L 5/0057;
(Continued)

(56) References Cited

U.S. PATENT DOCUMENTS

2005/0124299 A1* 6/2005 Scribano et al. ............... 455/68
2008/0232376 A1* 9/2008 Huang et al. ............. 370/395.3
(Continued)

FOREIGN PATENT DOCUMENTS

KR 10-2008-0112946 A 12/2008
KR 10-2009-0028056 A 3/2009
(Continued)

OTHER PUBLICATIONS

ETSI TS 129 212 v7.4.0 (Apr. 2008), Pertinent pp. 11, 13, 24, 32, 39, 40.*

*Primary Examiner* — Brian J Gillis
*Assistant Examiner* — Thao Duong
(74) *Attorney, Agent, or Firm* — Jefferson IP Law, LLP

(57) ABSTRACT

A method and apparatus for establishing a session by a Policy and Charging Enforcement Function (PCEF) module in a Packet Switched (PS) network, in which the PCEF module transmits bearer information indicating whether the session supports a single bearer or multiple bearers, to a Policy and Charging Rules Function (PCRF) module, receives a Policy & Charging Control (PCC) rule generated based on the bearer information, from the PCRF module, and establishes a session for a packet service by applying the received PCC rule.

12 Claims, 6 Drawing Sheets

(51) Int. Cl.
*H04L 12/14* (2006.01)
*H04W 80/10* (2009.01)

(58) Field of Classification Search
CPC ............. H04L 1/1692; H04L 5/0035; H04L 5/006; H04L 5/0007; H04L 1/0073
See application file for complete search history.

(56) References Cited

U.S. PATENT DOCUMENTS

| | | |
|---|---|---|
| 2009/0196213 A1* | 8/2009 | Zhong ................. H04W 36/06 370/312 |
| 2010/0040047 A1 | 2/2010 | Castellanos Zamora et al. |
| 2010/0226350 A1 | 9/2010 | Lim et al. |
| 2012/0144049 A1* | 6/2012 | Lopez Nieto et al. ....... 709/228 |
| 2012/0243547 A1* | 9/2012 | Pardo-Blazquez et al. .. 370/401 |

FOREIGN PATENT DOCUMENTS

| | | |
|---|---|---|
| KR | 10-2009-0033968 A | 4/2009 |
| WO | 2007/149020 A1 | 12/2007 |

\* cited by examiner

APPARATUS AND METHOD FOR ESTABLISHING SESSION IN A PACKET SWITCHED NETWORK

TECHNICAL FIELD

The present invention relates generally to an apparatus and method for establishing a session, and more particularly, to an apparatus and method for establishing a session in a Packet Switched (PS) network.

BACKGROUND ART

In line with the rapid development of mobile communication and Internet technologies and the increasing demands for various services subscribers, the recent mobile communication services have been advanced to provide not only the existing voice call service, but also a high-speed packet data service capable of transmitting E-mails, still images and massive digital data over the mobile terminals. Accordingly, mobile communication systems have been evolving from the voice-based Circuit Switched (CS) domain into the packet-based Packet Switched (PS) domain.

A Core Network (CN) providing the multimedia services over the Internet is making progress from the existing circuit-switched CN to a packet-switched CN, evolving into an Internet Protocol (IP)-based CN. A communication system providing IP multimedia services to subscribers over the IP-based CN is called an IP Multimedia Subsystem (IMS). In 3rd Generation Partnership Project (3GPP)/3rd Generation Partnership Project 2 (3GPP2), many studies are underway to seamlessly provide ALL IP service over the IMS.

DISCLOSURE OF INVENTION

Technical Problem

In performing bearer binding or changing a session in the IMS network, each operation flow of generating a Policy & Charging Control (PCC) rule is executed in a different way according to the attribute of the number of bearers in the session in a Policy and Charging Rules Function (PCRF). However, the PCRF has no specific method proposed to receive accurate information about bearers from a Policy and Charging Enforcement Function (PCEF). Therefore, the PCRF has difficulty in proceeding with the next flow due to the lack of the basis for determining information about supportable bearers.

Solution to Problem

An aspect of the present invention is to address at least the above-mentioned problems and/or disadvantages and to provide at least the advantages described below. Accordingly, an aspect of exemplary embodiments of the present invention is to clearly provide each operation flow of setting a PCC rule according to the attribute of the number of bearers in a session.

Another aspect of exemplary embodiments of the present invention is to allow a PCEF module to proceed with a bearer binding procedure, when a session supports only a single bearer.

Another aspect of exemplary embodiments of the present invention is to allow a PCRF module to generate bearers, or to close a session to retry a service, when the session supports multiple bearers.

In accordance with one aspect of the present invention, there is provided a method for establishing a session by a Policy and Charging Enforcement Function (PCEF) module in a Packet Switched (PS) network, in which the PCEF module transmits, to a Policy and Charging Rules Function (PCRF) module, bearer information indicating whether the session supports a single bearer or multiple bearers, receives a Policy & Charging Control (PCC) rule generated based on the bearer information, from the PCRF module, and establishes a session for a packet service by applying the received PCC rule.

In accordance with another aspect of the present invention, there is provided a method for establishing a session by a Policy and Charging Rules Function (PCRF) module in a Packet Switched (PS) network, in which the PCRF module receives bearer information indicating whether the session supports a single bearer or multiple bearers, from a Policy and Charging Enforcement Function (PCEF) module, generates a Policy & Charging Control (PCC) rule based on the received bearer information, and transmits the generated PCC rule to the PCEF module.

In accordance with another aspect of the present invention, there is provided an apparatus for establishing a session of a Policy and Charging Enforcement Function (PCEF) module in a Packet Switched (PS) network, in which a transmitter transmits, to a Policy and Charging Rules Function (PCRF) module, bearer information indicating whether the session supports a single bearer or multiple bearers, a receiver receives a Policy & Charging Control (PCC) rule generated based on the bearer information, from the PCRF module, and a controller controls to transmit the bearer information to the PCRF module, and controls to establish a session for a packet service by applying the PCC rule received from the PCRF module.

In accordance with another aspect of the present invention, there is provided an apparatus for establishing a session of a Policy and Charging Rules Function (PCRF) module in a Packet Switched (PS) network, in which a receiver receives bearer information indicating whether the session supports a single bearer or multiple bearers, from a Policy and Charging Enforcement Function (PCEF) module, a controller controls to generate a Policy & Charging Control (PCC) rule based on the received bearer information, and a transmitter transmits the generated PCC rule to the PCEF module.

Advantageous Effects of Invention

The present invention clearly provides each operation flow of setting a PCC rule according to the attribute of the number of bearers in a session. By doing so, the PCRF module may proceed with a bearer binding procedure if the session supports only a single bearer, and the PCEF module may generate bearers, or may close the session to retry the service if the session supports multiple bearers. That is, when proceeding with a service, the PCC structure's operator may reduce the time for which the subscriber's service is interrupted due to the non-transmission of the PCC rule to the PCEF module.

BRIEF DESCRIPTION OF DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

MODE FOR THE INVENTION

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
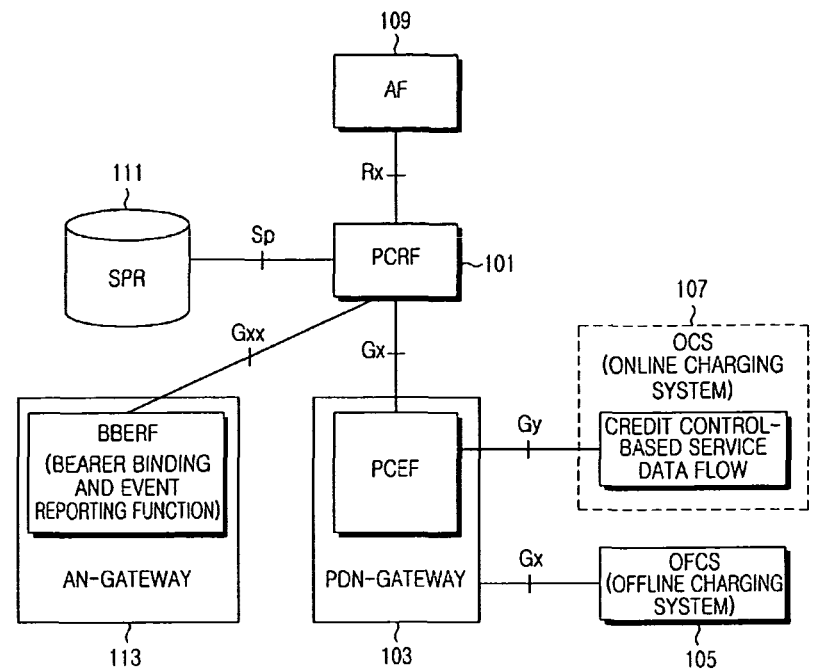
FIG. 1 is a diagram showing a PCC structure on which the present invention is based.

FIG. 1 shows a PCC structure on which the present invention is based. In the description of FIG. 1, only some elements necessary for the present invention are described, and a description of the other elements is omitted.

The present invention is based on a PS network. In the following description, for convenience' sake, an IMS is given as an example of the PS network. As to the IMS, up to its Release 6 has defined a Go interface using a Common Open Policy Service (COPS) protocol, between functional modules—a Policy Decision Function (PDF) and a Policy Enforcement Point (PEP)—, for Quality of Service (QoS) and policy enforcement. However, Release 7 and Release 8 have defined Gx interfaces, which are based on Diameter. In addition, the terms 'PEP' and 'PDF' are also changed to a Policy and Charging Enforcement Function (PCEF) 103 and a Policy and Charging Rules Function (PCRF) 101, respectively, by being integrated into charging functions.

The PCRF 101, a policy decision function for applying various QoS and charging policies differentiated for individual IMS service flows, includes a policy control function defined in the 3GPP Rel. 7 Policy & Charging Control (PCC) structure. A PCRF system may accept both a policy decision function and a charging control-based flow function defined in 3GPP Release 6, and during an IMS service, the PCRF system guarantees QoS differentiated for each service, and makes it possible to apply differentiated charging rates. Rather than applying QoS or generating charging data by itself, the PCRF system generates a PCC rule, according to which an IP edge may differentiate QoS application and charging data generation for each service. That is, an IP edge node supporting an IP-Connectivity Access Network (IP-CAN) generates a PCC rule needed to apply QoS and charging policy differentiated for each IMS service data flow to one or more bearers in the IP-CAN, through which an IMS service data flow is transmitted.

The PCEF 103 includes a policy enforcement function and a charging functionality-based flow, and is located in an IP edge node (for example, which corresponds to a Gate GPRS Support Node (GGSN) in the case of General Packet Radio Service (GPRS), a Packet Data Serving Node (PDSN) in the case of Code Division Multiple Access (CDMA), and an Access Control Router (ACR) in the case of the ACR. The 103 provides a service data flow detection function, a user plane traffic handling function, a triggering control plane session management function (where the IP-CAN permits), a QoS handling function, and a service data flow estimation function. In addition, the PCEF 103 provides charging information in cooperation with online and offline charging servers.

The PCC rule is for handling policy and charging for QoS in association with each other, and may be generated using (i) information including a type of a service approved for a subscriber, quality information of the approved service, charging information, and a subscriber category, (ii) information received from an Application Function (AF) 109, which includes an IP address of a User Equipment (UE), media type and bandwidth, application information of the AF 109, and record information, and (iii) information requested from a GGSN, which includes an IP address of a UE, subscriber authentication information, etc.

Figure 2:
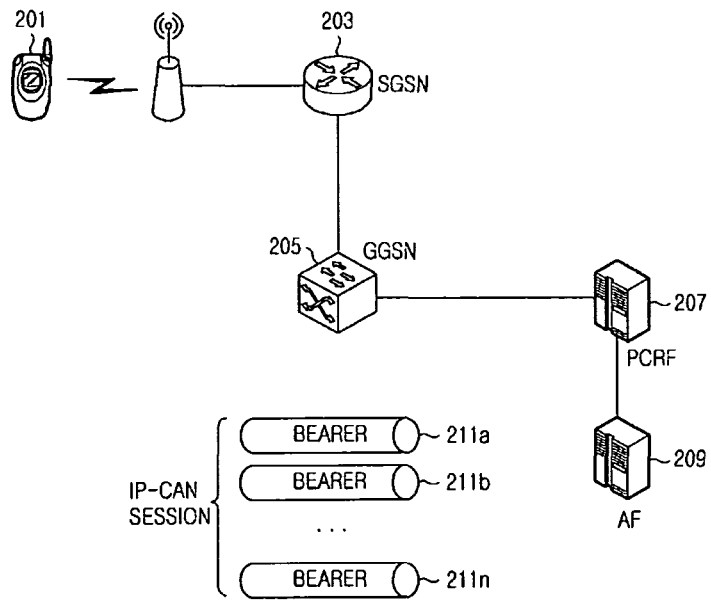
FIG. 2 is a diagram showing a basic structure of GPRS, on which the present invention is based.

FIG. 2 shows a basic structure of GPRS, on which the present invention is based.

To access this IMS network, a UE should pass through the IP-CAN. The IP-CAN refers to an access network for transmitting packet data to the UE. However, networks such as GPRS and Electronic Parking System (EPS) may replace the IP-CAN. In the following description, Serving GPRS Support Node (SGSN) and GGSN will be given as an example of GPRS.

Generally, a UE 201 or a PCEF located in a GGSN 205 generates bearers 211a to 211n in the IP-CAN, receives a PCC rule to be applied to a Service Data Flow (SDF) of the bearers from a PCRF 207, and applies the received PCC rule. The number of supportable bearers 211a to 211n in the IP-CAN may be singular or multiple according to the type of the IP-CAN, PCEF and UE. That is, an operation of setting a PCC rule by a PCRF is different according to the attribute of the number of bearers in the IP-CAN.

Figure 3:
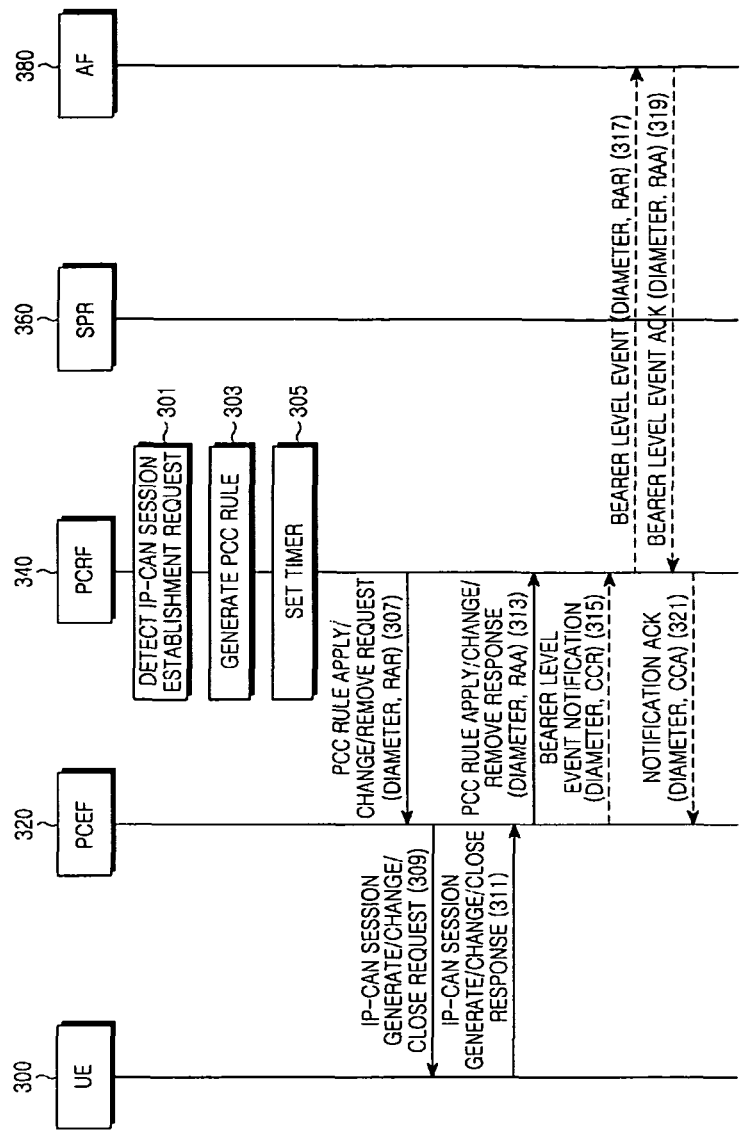
FIG. 3 is a diagram showing a general PCRF-initiated IP-CAN session establishment procedure.

FIG. 3 shows a general PCRF-initiated IP-CAN session establishment procedure.

Upon detecting an IP-CAN session establishment request in step 301, a PCRF 340 generates PCC rule information including information about QoS decision and charging rules in step 303. After generating the PCC rule, the PCRF 340 sets or starts a timer in step 305 while waiting for a PCC rule request from a PCEF 320. Thereafter, in step 307, the PCRF 340 requests the PCEF 320 to apply/change/remove the PCC rule using a Re-Auth-Request (RAR) command according to whether the IP-CAN session supports a single bearer or multiple bearers. Upon receiving the RAR command, the PCEF 320 requests the UE 300 to generate/change/close an IP-CAN session in step 309.

In step 311, the UE 300 sends a response to the request for generating/changing/closing an IP-CAN session, to the PCEF 320. In step 313, upon receiving the response, the PCEF 320 sends a PCC rule apply/change/remove response to the PCRF 340 using a Re-Auth-Answer (RAA) command. In addition, the PCEF 320 notifies the PCRF 340 of a bearer level event using a Credit-Control-Request (CCR) command in step 315. In step 317, the PCRF 340 receives the bearer level event notified in step 315, and transmits the received bearer level event to an AF 380 using a RAR command. In step 319, the AF 380 transmits an RAA command to the PCRF 340 in response to the receipt of the RAR command. In step 321, the PCRF 340 sends a notification response to the PCEF 320 using a Credit-Control-Answer (CCA) command.

However, referring to Tables 1 and 2 below corresponding to a part of the description of 3GPP TS. 29.213, as in the description of FIG. 3, each operation flow of setting a PCC rule according to the attribute of the number of bearers in an IP-CAN session is not specified in 3GPP TS. 29.213.

First, in the case where a PCC rule is newly generated and bound with a specific bearer in an IP-CAN session, since the PCRF already has bearer information about the IP-CAN session supporting only the single bearer, the PCRF can bind the PCC rule with the bearer even though the PCEF does not provide specific information. However, in Table 1, in accordance with the standard mentioned for the case where the PCEF supports the single bearer, which is specified in the bearer binding mechanism, the PCRF cannot determine whether the IP-CAN session supports only the single bearer or multiple bearers.

TABLE 1

NOTE: For an IP-CAN, limited to a single IP-CAN bearer per IP-CAN session, the bearer is implicit, so finding the IP-CAN session is sufficient for successful bearer binding.

Second, in the description of another standard, the PCRF sets or starts a timer waiting for a PCC rule request from the PCEF after a PCC rule is generated. However, in Table 2, in accordance with the phrase specified for an IP-CAN session change signaling flow, a flow after expiry of the timer after generation of the PCC rule is not clearly specified.

TABLE 2

If the timer expires and the PCRF still requires additional filter information coming from the UE in order on bearer binding for new PCC rules to be installed. All subsequent steps in the present figure shall not be executed, and further reactions of the PCRF are left unspecified. As a possible option, the PCRF could abort the AF session.

Therefore, the PCRF cannot proceed with the next flow due to the lack of the basis for determining supportable bearers. Accordingly, the present invention has been proposed for the ambiguous parts of the standard in the bearer binding and IP-CAN session establishment procedure during a PCRF-PCEF operation based on the PCC structure.

To be specific, the present invention has been proposed to generate a new Attribute-Value-Pair (AVP) for the RFC 4006 standard and enable use of the new AVP for a CCR command of Gx-Interface (defined in 3GPP TS. 29.212). That is, by adding a new AVP indicating whether the IP-CAN supports a single bearer or multiple bearers, the proposed invention allows the PCRF to determine its operation when the timer has expired while waiting for a PCC rule request from the PCEF. To this end, the present invention allows the PCEF to transmit the IP-CAN's attribute information to the PCRF so that it may proceed with the procedure specified in the bearer binding standard.

Figure 4:
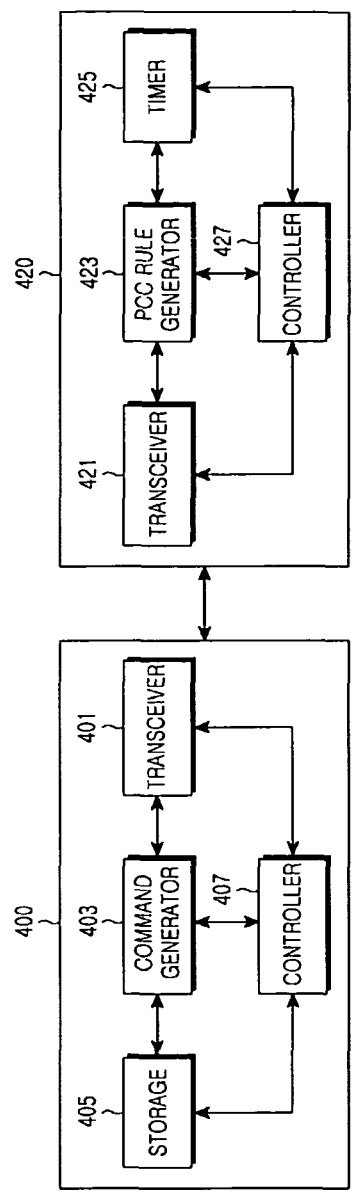
FIG. 4 is a diagram showing structures of a PCEF and a PCRF according to an embodiment of the present invention.

FIG. 4 shows structures of a PCEF and a PCRF according to an embodiment of the present invention.

A PCEF 400 may include a transceiver 401, a command generator 403, a storage 405, and a controller 407. The transceiver 401 receives an IP-CAN session establishment request from a UE, transmits a CCR command including bearer information to a PCRF 420 to establish an IP-CAN session, and receives an IP-CAN session establishment ACK, or a CCA command, from the PCRF 420. The command generator 403 generates the CCR command including bearer information, an RAR command for a PCC rule apply/change/remove request, and a CCA command and an RAA command, which are response commands to the CCR command and the RAR command, respectively. The storage 405 stores information about the bearer, which is included in the CCR command and transmitted to the PCRF 420. Upon receiving an IP-CAN session establishment request from the UE, the controller 407 generates a CCR command including bearer information and transmits the CCR command to the PCRF 420 to instruct establishment of an IP-CAN session. After storing the bearer information included in the CCR command, the controller 407 receives the CCA command from the PCRF 420 and applies a PCC rule included in the received CCA command.

The PCRF 420 may include a transceiver 421, a PCC rule generator 423, a timer 425, and a controller 427. The transceiver 421 receives the CCR command from the PCEF 400, and transmits a CCA command including a PCC rule. The PCC rule generator 423 generates a PCC rule based on the bearer information in the received CCR command. The timer 425 is set while the PCRF 420 is waiting for a PCC rule request from the PCEF 400. During initial IP-CAN session establishment, the controller 427 receives the CCR command from the PCEF 400, generates a PCC rule based on bearer information in the received CCR command, and transmits the generated PCC rule to the PCEF 400 using the CCA command. Upon detecting an IP-CAN session establishment request after the initial IP-CAN session establishment, the controller 427 generates a PCC rule, and sets the timer 425. Upon expiry of the timer 425, the controller 427 determines whether to include a bearer Identifier (ID) in the generated PCC rule according to the bearer information stored in the process of initially establishing the IP-CAN session, and performs a bearer binding procedure or a bearer generation procedure depending on the determination results. The controller 427 may close the session without performing the bearer generation procedure.

Figure 5:
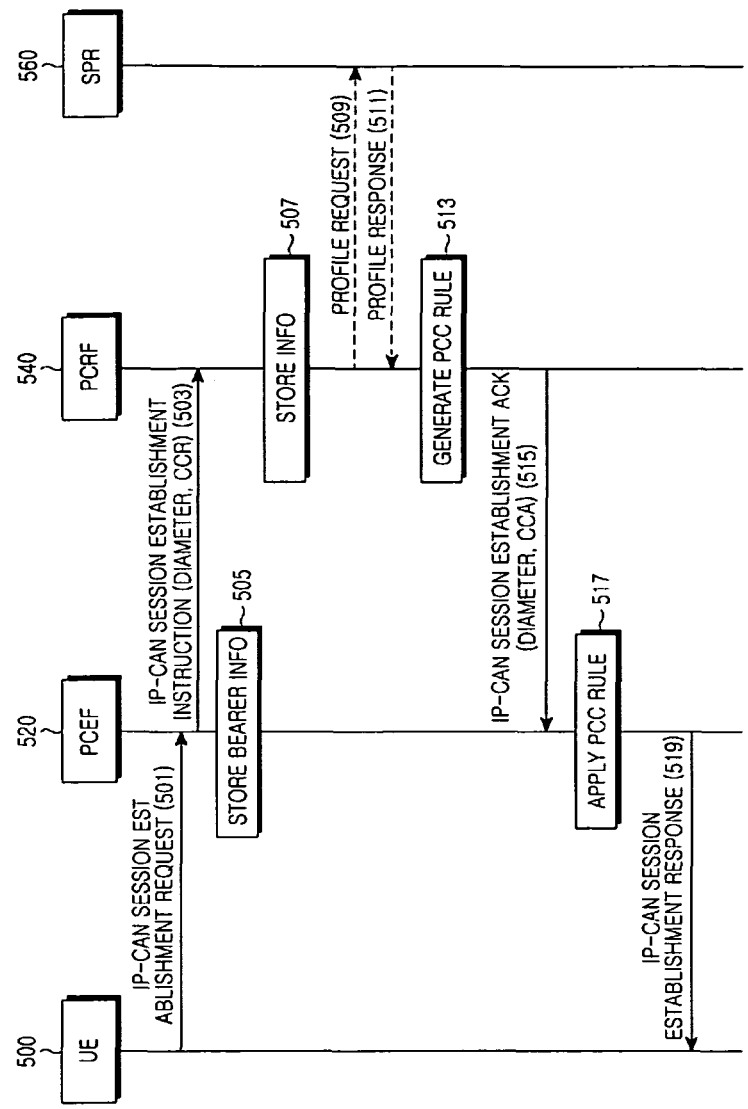
FIG. 5 is a diagram showing a process of initially establishing an IP-CAN session according to an embodiment of the present invention.

FIG. 5 shows a process of initially establishing an IP-CAN session according to an embodiment of the present invention.

In step 501, a UE 500 requests a PCEF 520 to establish an IP-CAN session. Upon receiving the request, the PCEF 520 transmits to a PCRF 540 a CCR command to instruct establishment of an IP-CAN session, in step 503. A new VAP is added in the CCR command as shown in Table 3.

TABLE 3

Single-Bearer-Support AVP (All Access Types)The Single-Bearer-Support AVP (AVP code XXX) is of type Enumerated. The value of the AVP indicates whether the GGSN supports multiple bearers in an IP-CAN session. If the GGSN supports a Single-Bearer, the PCRF shall execute bearer-binding while provision a PCC rule in a RAR or CCA command. If no Single-Bearer-Support AVP has been supplied for an IP CAN session, the default value SINGLE_BEARER_NOT_SUPPORTED is applicable. The following values are defined:
SINGLE_BEARER_NOT_SUPPORTED (0) This value indicates that the IP-CAN session supports multiple bearers. This is the default value applicable if no Single-Bearer-Support AVP has been supplied for an IP CAN session. SINGLE_BEARER_SUPPORTED (1) This value indicates that the IP-CAN session supports a single bearer.

The VAP added in the CCR command of Table 3 is as shown in Table 4.

TABLE 4

CC-Request(CCR) CommandMessage Format:<CC-Request> ::= <
Diameter Header: 272, REQ, PXY > < Session-Id > { Auth-Application-
Id } { Origin-Host } { Origin-Realm } { Destination-Realm }
{ CC-Request-Type } { CC-Request-Number } [ Destination
-Host ] [ Origin-State-Id ] *[ Subscription-Id ] *[ Supported-Features ] [
Single-Bearer-Support ] --> Newly Added AVP [ Network-Request-
Support ] *[ Packet-Filter-Information ] [ Packet-Filter-Operation ]
[ Bearer-Identifier ] [ Bearer-Operation ] [ Framed-IP-Address ]
[ Framed-IPv6-Prefix ] [ IP-CAN-Type ] [ RAT-Type ] [ Termination-
Cause ] [ User-Equipment-Info ] [ QoS-Information ] [ QoS-
Negotiation ] [ QoS-Upgrade ] [ Default-EPS-Bearer-QoS ] 0*2[ AN-
GW-Address ] [ 3GPP-SGSN-MCC-MNC ] [ 3GPP-SGSN-
Address ] [ 3GPP-SGSN-IPv6-Address ] [ RAI ] [ 3GPP-User-
Location-Info] [ 3GPP-MS-TimeZone ] [ Called-Station-ID ] [
Bearer-Usage ] [ Online ] [ Offline ] *[ TFT-Packet-Filter-Information ]
*[ Charging-Rule-Report] *[ Event-Trigger] [ Event-Report-Indication]
[ Access-Network-Charging-Address ] *[ Access-Network-Charging-
Identifier-Gx ] *[ CoA-Information ] *[ Proxy-Info ] *[ Route-
Record ] *[ AVP ]

After step 503, the PCEF 520 stores bearer information in step 505. In step 507, the PCRF 540 stores information included in the received CCR command. In step 509, the PCRF 540 requests a Subscription Profile Repository (SPR) 560 to provide a profile. In response thereto, the SPR 560 sends a profile response to the PCRF 540 in step 511. Thereafter, in step 513, the PCRF 540 generates a PCC rule including QoS information and charging rules information, using the service information included in the CCR command received in step 503 and the profile response received in step 511 The generated PCC rule is for generating a bearer(s) in the IP-CAN session and applying it to an SDF of the bearer, and the PCC rule is included in a CCA command, or a response message to the CCR command received in step 503, and transmitted to the PCEF 520 in step 515. The PCEF 520 applies the PCC rule included in the received CCA command in step 517, and sends an IP-CAN session establishment response to the UE 500 in step 519.

The number of supportable bearers in the IP-CAN session may be singular or multiple according to the type of the IP-CAN, PCEF and UE. An operation of applying a PCC rule by the PCEF is different depending on the attribute of the number of bearers in the IP-CAN session. Now, reference will be made to FIGS. 6 and 7 to describe an IP-CAN session establishment procedure in detail, which is different according to whether an IP-CAN session can support a single bearer or multiple bearers after the IP-CAN session is initially established.

Figure 6:
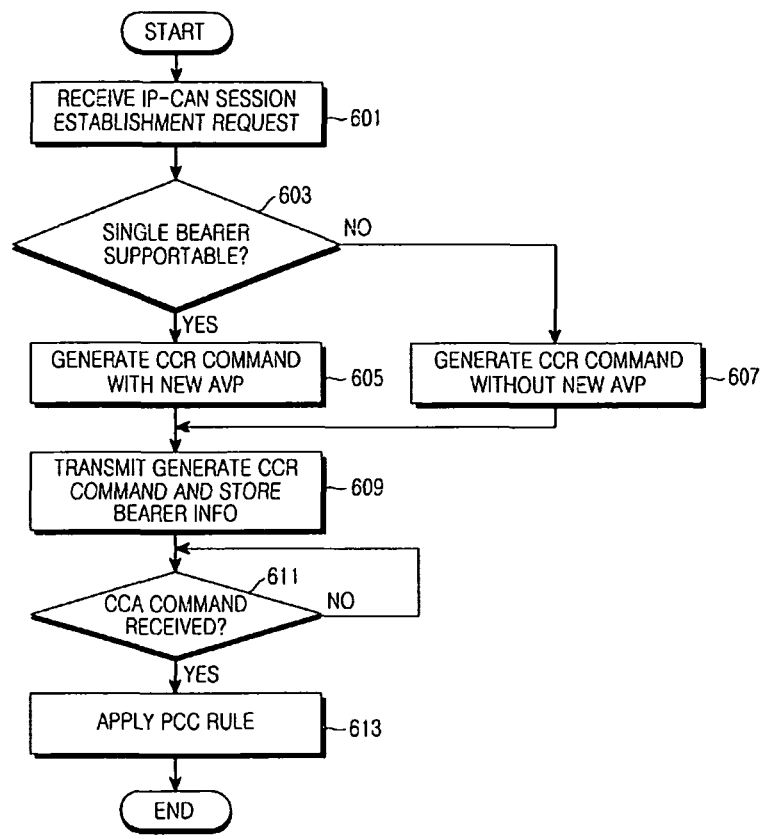
FIG. 6 is a diagram showing a process of establishing an IP-CAN session in a PCEF according to an embodiment of the present invention.

FIG. 6 shows a process of establishing an IP-CAN session in a PCEF according to an embodiment of the present invention.

Upon receiving an IP-CAN session establishment request from a UE in step 601, a PCEF determines in step 603 whether the IP-CAN session supports a single bearer. If the IP-CAN session supports a single bearer, the PCEF generates a CCR command including a new AVP, or information about a bearer, in step 605. Thereafter, in step 609, the PCEF transmits the generated CCR command to a PCRF and stores the bearer information.

However, if the IP-CAN session supports multiple bearers, the PCEF generates a CCR command without bearer information in step 607, and then proceeds to step 609.

After step 609, the PCEF determines in step 611 whether a CCA command has been received. Upon receiving the CCA command, the PCEF applies a PCC rule included in the received CCA command in step 613.

Figure 7:
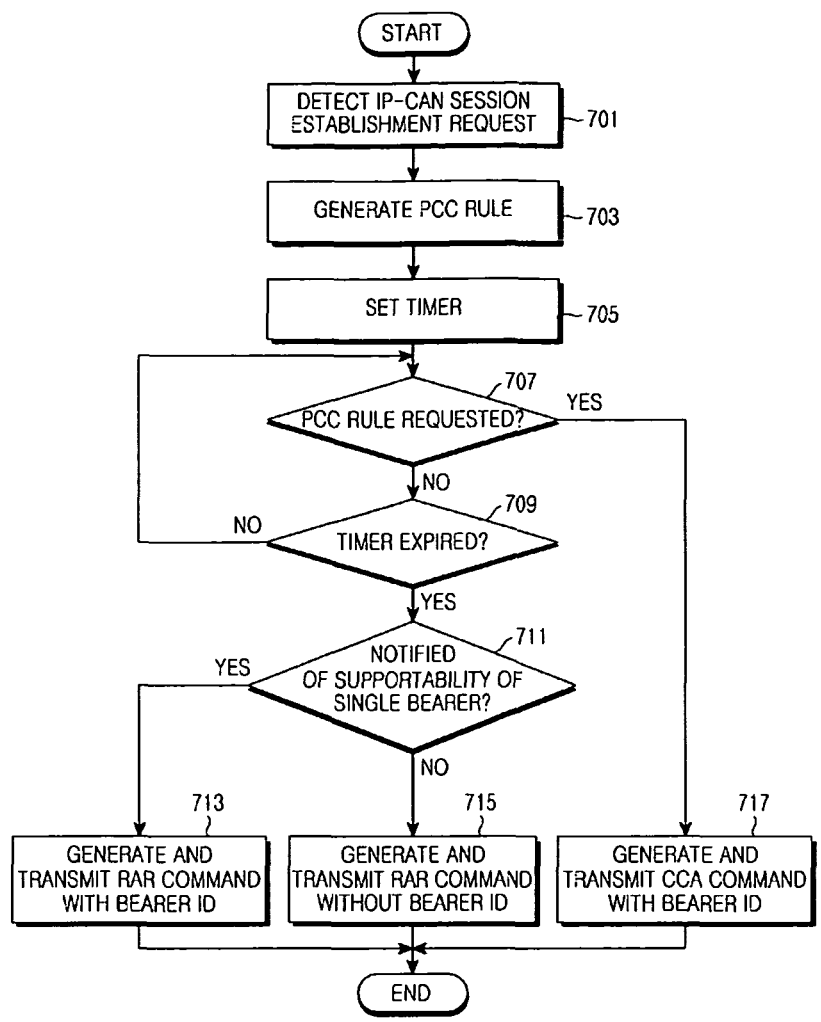
FIG. 7 is a diagram showing a process of establishing an IP-CAN session in a PCRF according to an embodiment of the present invention.

FIG. 7 shows a process of establishing an IP-CAN session in a PCRF according to an embodiment of the present invention.

Upon detecting an IP-CAN session establishment request in step 701, a PCRF generates a PCC rule in step 703, and sets a timer in step 705. Thereafter, the PCRF determines in step 707 whether a PCC rule has been requested. If a PCC rule has been requested, the PCRF generates a CCA command so that a bearer ID may be included in the PCC rule generated in step 703, and then transmits the generated CCA command to a PCEF, in step 717.

However, if no PCC rule has been requested, the PCRF determines in step 709 whether the timer has expired. If the timer has not expired, the PCRF returns to step 707. Otherwise, if the timer has expired, the PCRF determines in step 711 whether the PCEF has notified the PCRF whether the IP-CAN session supports a single bearer or multiple bearers, using a CCR command transmitted during initial IP-CAN session establishment, or in step 503 of FIG. 5. The determination can be made based on the information stored in step 507 of FIG. 5.

If the PCEF has notified that the IP-CAN session supports a single bearer, the PCRF, recognizing that only a single bearer is present in the IP-CAN session, generates an RAR command so that a bearer ID may be included in the PCC rule generated in step 703, and then transmits the generated RAR command to the PCEF so that it may apply the PCC rule, thereby performing bearer binding, in step 713.

However, if the PCEF has notified that the IP-CAN session supports multiple bearers, the PCRF, recognizing that multiple bearers are present in the IP-CAN session, generates a RAR command so that no bearer ID may be included in the generated PCC rule, and transmits the generated RAR command to the PCEF so that the PCEF may generate a bearer(s), in step 715. Though not shown in FIG. 7, the PCRF may close the session to the PCEF in step 715.

So far, it has been described that the PCEF transmits a CCR command including bearer information if the IP-CAN session supports a single bearer, and transmits a CCR command without bearer information if the IP-CAN session supports multiple bearers. However, the above is a mere example of the invention, and is subject to change according to the settings by the service provider.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for establishing a session by a policy and charging enforcement function (PCEF) module in a packet switched (PS) network, the method comprising:
   receiving a request for establishing the session from a user equipment (UE);
   determining whether the session supports a single bearer or not;
   generating a credit control request (CCR) command with bearer information for identifying a type of a bearer when the session supports the single bearer, or generating the CCR command without the bearer information when the session does not support the single bearer;

transmitting, to a policy and charging rules function (PCRF) module, the generated bearer information CCR command and storing the bearer information;
determining whether a credit control answer (CCA) command including a policy and charging control (PCC) rule is received or not, from the PCRF module; and
establishing the session for a packet service by applying the received PCC rule based on the determining,
wherein the bearer information is transmitted as a single-bearer-support attribute value pair (AVP), and the single-bearer-support AVP has one of values 'SINGLE_ BEARER_SUPPORTED(1)' and 'SINGLE_BEARER_NOT_SUPPORTED(0)'.

2. The method of claim 1, further comprising:
performing a bearer binding procedure, when a bearer Identifier (ID) is included in the received PCC rule; and
generating a bearer, when no bearer ID is included in the received PCC rule.

3. A method for establishing a session by a policy and charging rules function (PCRF) module in a packet switched (PS) network, the method comprising:
receiving a credit control request (CCR) command with bearer information for identifying a type of a bearer from a policy and charging enforcement function (PCEF) module;
generating a policy and charging control (PCC) rule;
determining whether the PCC rule is requested or not based on the CCR command;
determining whether the session supports a single bearer or not based on the CCR command;
generating a credit control answer (CCA) command including the PCC rule along with a bearer Identifier (ID), when the PCC rule is requested, or generating a re-auth-request (RAR) command with the bearer ID, when the PCC rule is not requested and the session supports the single bearer, or generating an RAR command without the bearer ID, when the PCC rule is not requested and the session does not support the single bearer;
transmitting the generated CCA command with the bearer ID, or the generating RAR command with the bearer ID, or the generated RAR command without the bearer ID,
wherein the bearer information is received as a single-bearer-support attribute value pair (AVP), and the single-bearer-support AVP has one of values 'SINGLE_ BEARER_NOT_SUPPORTED(0)' and 'SINGLE_BEARER_SUPPORTED(1)'.

4. The method of claim 3, further comprising storing the bearer information received from the PCEF module.

5. The method of claim 3, further comprising:
after generating the PCC rule, starting a timer.

6. The method of claim 5, further comprising:
when it is determined that the PCC rule is not requested, determining whether the timer has expired; and
checking the received bearer information, when the timer has expired.

7. An apparatus for establishing a session of a policy and charging enforcement function (PCEF) module in a packet switched (PS) network, the apparatus comprising:
a receiver configured to receive a request for establishing the session from a user equipment (UE);
a controller configured to:
determine whether the session supports a single bearer or not, and
generate a credit control request (CCR) command with bearer information for identifying a type of a bearer when the session supports the single bearer, or generate the CCR command without the bearer information when the session does not support the single bearer; and
a transmitter configured to transmit, to a policy and charging rules function (PCRF) module, the generated CCR command,
wherein the controller is further configured to:
store the bearer information,
determine whether a credit control answer (CCA) command including a policy and charging control (PCC) rule is received or not from the PCRF module, and
establish the session for a packet service by applying the PCC rule received from the PCRF module,
wherein the bearer information is transmitted as a single-bearer-support attribute value pair (AVP), and the single-bearer-support AVP has one of values 'SINGLE_ BEARER_NOT_SUPPORTED(0)' and 'SINGLE_BEARER_SUPPORTED(1)'.

8. The apparatus of claim 7, wherein the controller is further configured to:
perform a bearer binding procedure, when a bearer Identifier (ID) is included in the received PCC rule, and
generate a bearer, when no bearer ID is included in the received PCC rule.

9. An apparatus for establishing a session of a policy and charging rules function (PCRF) module in a packet switched (PS) network, the apparatus comprising:
a receiver configured to receive a credit control request (CCR) command with bearer information for identifying a type of a bearer, from a policy and charging enforcement function (PCEF) module;
a controller configured to:
generate a policy and charging control (PCC) rule,
determine whether the PCC rule is requested or not based on the CCR command,
determine whether the session supports a single bearer or not based on the CCR command, and
generate a credit control answer (CCA) command including the PCC rule along with a bearer Identifier (ID), when the PCC rule is requested, or generate a re-auth-request (RAR) command with the bearer ID, when the PCC rule is not requested and the session supports the single bearer, or generate an RAR command without the bearer ID, when the PCC rule is not requested and the session does not support the single bearer; and
a transmitter configured to transmit the generated CCA command with the bearer ID, or the generated RAR command with the bearer ID, or the generated RAR command without the bearer ID,
wherein the bearer information is received as a single-bearer-support attribute value pair (AVP), and the single-bearer-support AVP has one of values 'SINGLE_ BEARER_NOT_SUPPORTED(0)' and 'SINGLE_BEARER_SUPPORTED(1)'.

10. The apparatus of claim 9, further comprising a memory for storing the bearer information received from the PCEF module.

11. The apparatus of claim 10, wherein after generating the PCC rule, the controller is further configured to start a timer.

12. The apparatus of claim 11, wherein when it is determined that no PCC rule is requested, the controller is further configured to:
determine whether the timer has expired, and
check the received bearer information when the timer has expired.

* * * * *